US005766303A

United States Patent [19]
Bitler et al.

[11] Patent Number: 5,766,303
[45] Date of Patent: Jun. 16, 1998

[54] PROCESS FOR THE REMEDIATION OF LEAD-CONTAMINATED SOIL AND WASTE BATTERY CASINGS

[75] Inventors: John A. Bitler, Denver; John P. Baranski, Sinking Spring, both of Pa.

[73] Assignee: Exide Corporation, Reading, Pa.

[21] Appl. No.: 715,340

[22] Filed: Sep. 18, 1996

Related U.S. Application Data

[60] Provisional application No. 60/003,956 Sep. 19, 1995.

Related U.S. Application Data

[63] Continuation-in-part of Ser. No. 616,761, Mar. 15, 1996, abandoned, which is a continuation of Ser. No. 274,829, Jul. 14, 1994, abandoned, which is a continuation of Ser. No. 149,340, Nov. 9, 1993, Pat. No. 5,370,724, which is a continuation of Ser. No. 973,236, Nov. 10, 1992, Pat. No. 5,284,503.

[51] Int. Cl.[6] .................................................. C22B 13/00
[52] U.S. Cl. ........................ 75/10.19; 429/49; 405/129; 588/237
[58] Field of Search .......................... 75/10.19; 373/18, 373/22–25; 588/237; 429/49; 405/129

[56] References Cited

U.S. PATENT DOCUMENTS

| 4,177,061 | 12/1979 | Stenkvist et al. | 75/10.61 |
| 4,431,612 | 2/1984 | Bell et al. | |
| 4,998,486 | 3/1991 | Dighe et al. | 373/18 |
| 5,281,790 | 1/1994 | Handfield et al. | 75/10.19 |

OTHER PUBLICATIONS

"Energy–Saving DC Twin Shell Arc Furnace For Melting Low–Grade Scrap", ABB Review (Sep./Oct. 1996) pp. 18–27.

Chalfant, "Recovering Zinc and Iron From Electric–Furnace Dust", New Steel, p. 91, Sep. 1996.

Mintek, Application Report No. 11, "The Development, Up to Industrial Scale, of a Transferred Plasma–Arc Smelting Process for the Production of Ferro–Alloys" (1991) pp. 1–12.

Pyromet/Mintek, "Hollow Graphite Electrode D.C. Arc Furnace and Recovery Plant for Treatment of Steel Plant Dust" (1991), month unavailable pp. 1–18.

Mintek, Technology International, "Safe Disposal of Environmentally Unacceptable Dust" (1991) month available.

*Primary Examiner*—Melvyn Andrews
*Attorney, Agent, or Firm*—Nixon & Vanderhye P.C.

[57] ABSTRACT

Lead-contaminated soil and battery casings are remediated using a plasma arc furnace which pyrolyzes the soil and waste battery casings so as to form a vitrified slag and a combustible gas, respectively. The combustible gas along with volatilized lead (and other heavy metals which may be present) are transferred to, and used as a primary fuel by, a conventional smelting furnace. The volatilized lead that is entrained in the combustible gas is thus transferred to the recovery and environmental protection/control equipment associated with the smelting furnace or other conversion system. The soil, on the other hand, is converted into a non-toxic (i.e., according to the Toxicity Characteristic Leaching Procedure) vitrified slag by the plasma arc which may be crushed and used as a commercial material (e.g., roadway aggregate, asphalt filler material and the like) or simply transferred to a landfill where it poses no environmental threat.

9 Claims, 2 Drawing Sheets

PROCESS FOR THE REMEDIATION OF LEAD-CONTAMINATED SOIL AND WASTE BATTERY CASINGS

CROSS-REFERENCE TO RELATED APPLICATIONS

This application is based on Provisional U.S. patent application Ser. No. 60/003,956 filed on Sep. 19,1995 (pending) and is a continuation-in-part of U.S. patent application Ser. No. 08/616,761 filed on Mar. 15,1996 abandoned, which in turn is a continuation of application Ser. No. 08/274,829 filed on Jul. 14, 1994 (abandoned), which is a continuation of Ser. No. 08/149,340 filed Nov. 9, 1993 (now U.S. Pat. No. 5,370,724), which is a continuation of application Ser. No. 07/973,236 filed Nov. 10, 1992 (now U.S. Pat. No. 5,284,503).

FIELD OF INVENTION

The present invention relates generally to a process for the remediation of lead-contaminated soil and waste battery casings. More specifically, this invention relates to a novel process whereby a mixture of lead-contaminated soil and battery casings may be pyrolyzed in a plasma arc furnace so as to volatilized the battery casings to form a combustible CO gas that is then supplied as a primary fuel to a conventional smelting furnace. A major proportion of the lead contaminant and other metals whose vaporization temperature is less than 3200° F. is likewise volatilized and transferred along with the combustible gas to the smelting furnace where it can then be subjected to conventional lead (and other metal) recovery techniques. The soil, on the other hand, forms a vitrified slag in the plasma arc furnace and thereby serves as a non-toxic and non-leachable host matrix for any minor proportion of lead and other metals that are not volatilized or separated by partitioning.

BACKGROUND AND SUMMARY OF THE INVENTION

The safe treatment and disposal of all waste materials is demanded in most developed nations. In this regard, there is a growing demand on industry by environmentalists and government agencies to alleviate potentially toxic and/or contaminated waste disposal sites that were employed for many years prior to the public's heightened environmental concerns and the enactment of environmental legislation.

For example, a number of now defunct lead-acid battery recycling sites were operated where lead was reclaimed from spent lead-acid batteries. At most such lead-acid battery recycling sites, the primary operation consisted of breaking the battery case, draining the spent acid, and separating the battery cases from the commercially valuable lead to be recycled. The broken battery cases, which were at that time formed of a non-recyclable, hardened rubber material known in art parlance as "ebonite", were of no commercial value and were thus typically discarded as landfill waste. However, it is now known that these discarded battery cases in landfills nonetheless were contaminated with sufficient quantities of lead that could detrimentally affect the environment.

Various techniques have been proposed for the remediation of landfills containing lead-contaminated waste lead-acid battery casings. For example, The U.S. Bureau of Mines has proposed a chemical reclamation process for waste lead-acid battery casings whereby battery casing particles are carbonized by treatment in a sodium or ammonium carbonate solution followed by acid washing with nitric acetic or flurosilicic acids. See, "The Hazardous Waste Consultant", September/October 1991, pages 1.22–1.24.

Simply immobilizing the lead contamination at landfills has been identified as one possible option recently by Royer et al, "Control Technologies for Remediation of Contaminated Soil and Waste Deposits at Superfund Lead Battery Recycling Sites", Journal of Air & Waste Management Association, Volume 42, No. 7, pgs. 970–980 (July 1992). However, the authors indicate that immobilization by vitrification would be unsuitable due to the combustible nature of the casings.

It would therefore undoubtedly be desirable for a process to be proposed whereby landfill materials containing both lead-contaminated soil and waste lead-acid battery casings could be treated so as to ameliorate the environmental concerns posed by such landfill materials. It is towards providing such a process that the present invention is directed.

Broadly, the present invention is especially characterized in the treatment of lead-contaminated soil and battery casings using a plasma arc furnace which pyrolyzes the soil and waste battery casings so as to form a vitrified slag and a combustible gas, respectively. The combustible gas (which contains predominantly carbon monoxide) along with volatilized heavy metals (of which lead predominates) is directed to, and used as, a primary fuel by a conventional lead smelting furnace. The volatilized lead that is entrained in the combustible gas is thus transferred thereby to the lead recovery and environmental protection/control equipment associated with the smelting furnace. The soil, on the other hand, is converted into a non-toxic (i.e., according to the Toxicity Characteristic Leaching Procedure (TCLP) published in the Federal Register on Mar. 29, 1989, the entire content of which is expressly incorporated hereinto by reference) vitrified slag by the plasma arc which may be crushed and used as a commercial material (e.g., roadway aggregate, asphalt filler material or the like) or simply transferred to a landfill where it poses no environmental threat.

Further aspects and advantages of this invention will become apparent after careful consideration is given to the following detailed description of the preferred exemplary embodiment thereof.

BRIEF DESCRIPTION OF THE ACCOMPANYING DRAWINGS

Reference will hereinafter be made to the accompanying drawing FIGURES wherein like reference numerals throughout the various FIGURES depict like elements, and wherein FIG. 1 schematically depicts a flow diagram for a particularly preferred process scheme according to this invention; and FIG. 2 schematically depicts a partial cross-sectional view of a DC plasma arc furnace that may be employed in the practice of this invention..

DETAILED DESCRIPTION OF THE PREFERRED EXEMPLARY EMBODIMENTS

Figure 1:
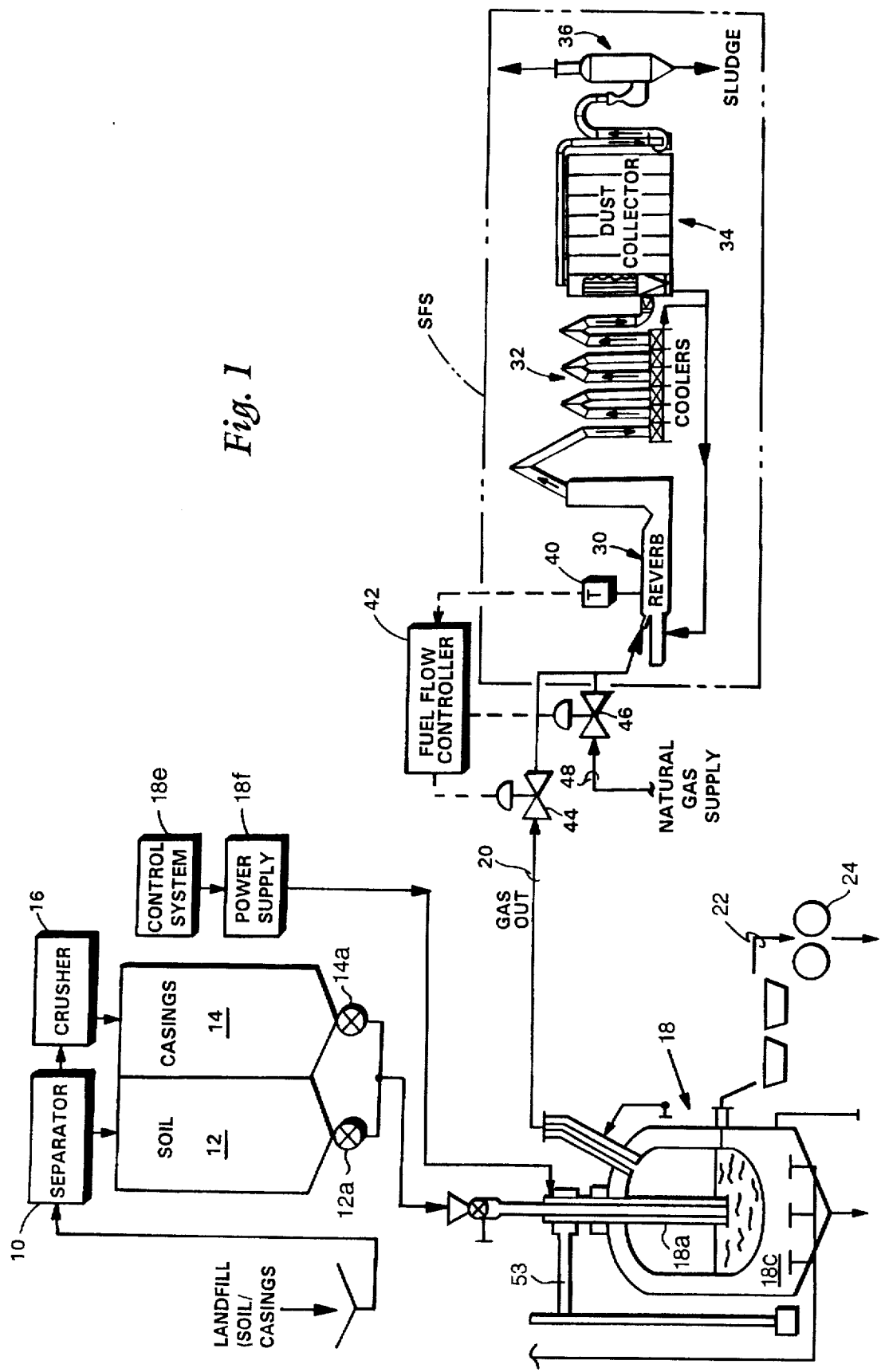

The accompanying FIG. 1 depicts a particularly preferred process flow diagram according to the present invention. In this connection, although the process depicted in the accompanying FIGURE operates on a batchwise basis, continuous processing of the lead-contaminated soil/battery casings according to this invention could equally be envisioned.

The soil and battery casing constituents of the landfill material are separated from one another by any suitable mechanical separatory technique (e.g., differential specific gravity apparatus, vibratory or non=-vibratory screens, and the like) schematically identified as separator 10 in FIG. 1. The soil component is transferred to a soil hopper 12, while the battery casing component is transferred to a casing hopper 14. Prior to being deposited into the hopper 14, however, the casings are most preferably crushed to a suitable size (e.g., average particle size between 0.375 inch to 0.625 inch) by a crusher 16.

The soil and casings hoppers 12,14 are provided with flow control valves 12a, 14a, respectively, so as to meter a batch charge having a predetermined ratio of soil to casings to the input hopper 18a of plasma arc furnace 18. Control of the valves 12a, 14a so as to meter the appropriate amounts of soil and casings, respectively, can be accomplished in any convenient manner, such as, by load scales associated with the hoppers 12,14 and/or the furnace 18 which supply an input signal to a flow controller for the valves 12a, 14a.

It will be understood that the battery casings which are typically associated with lead-contaminated landfills are formed of a hardened rubber composite material conventionally called "ebonite". The composite hardened rubber material can be a synthetic rubber (e.g., styrene-butadiene cross-linked with sulfur) having upwards of 40% of a carbonaceous material, such as anthracite coal or carbon black as a filler material. However, the present invention may equally be applied to landfills which may contain waste battery casings formed from a more modern polyolefinic resin (e.g., polypropylene).

The battery casings may be characterized as a solid organic material, whether formed of the discontinued ebonite material or the more modern polyolefinic material. It will therefore be understood that the greater the amount of casings in the batch charge to the plasma arc furnace 18, the greater the amount of combustible CO gas that will be produced by pyrolyzing the casings. Thus, since the combustible gas that is generated by pyrolyzing the casings is intended to be used as the primary fuel for a conventional smelting furnace system (as will be described in greater detail below), the preferred ratio of soil to casings is determined in large part by the fuel requirements of the smelting furnace system. By way of example, a smelting furnace (or other equipment intended to combustibly consume the combustible gas generated by the plasma arc furnace according to this invention) having a fuel requirement of 30×10$^6$ BTU/hr will typically dictate a soil to casings weight ratio of between about 7:1 to 5:1 being fed to the plasma arc furnace 18 in order to supply 100% of such fuel requirement.

The batch DC plasma arc furnace 18 depicted in the accompanying FIG. 1 includes a plasma torch or hollow graphite electrode 18a which is connected to a suitable control system 18b and direct current power supply 18c (preferably rated at at least about 350 volts and 400 amps) so as to generate a plasma torch within the crucible 18c. The particulates forming the feed mixture fed into the furnace 18 should preferably be not greater than about ⅝-inch nominal diameter.

It may be desirable to include a flux material with the mixture of soil and casings charged to the furnace 18, particularly when acidic soil is encountered, in order to reduce the soil melting point and thereby enhance its vitrification. Suitable fluxes may be, for example, blast furnace slag and/or limestone, and may be used in relatively minor quantities, e.g., up to 10 wt. %, more preferably, between about 5 to 10 wt. % of the furnace charge. In addition, the charge to the furnace 18 can conveniently be converted to reduction conditions by the addition of a carbon source (e.g., coke breeze, coal or the like) in suitable quantities.

The combustible gas which results from pyrolyzing the battery casings and the vaporized lead (as well as other vaporized metal contaminants in the soil/casings mixture) entrained thereby are transferred via line 20 to the smelting furnace system SFS. The vitrified slag, on the other hand, may be transferred via line 22 to a crusher 24 so that it may be broken into a particulate of selected size. The vitrified slag is non-toxic (i.e., since it does not test out of limits according to Toxicity Characteristic Leaching Procedure) and provides a host matrix for lead (or any other heavy metal) not volatilized during plasma arc furnace pyrolysis. Thus, the vitrified slag may be returned to a landfill without risk of environmental concerns or may be transferred to a storage site for later use as a commercial product (e.g., roadway aggregate, asphalt fill material, and the like).

As noted previously, the combustible gas resulting from pyrolyzing the battery casings is transferred to a smelting furnace system SFS which is conventionally employed in lead-smelting operations. The smelting furnace system SFS thus typically is comprised of a smelting furnace 30 (which may be a reverbatory type furnace as is shown in the accompanying FIGURE) and downstream environmental control equipment, such as a cooler section 32 (which condenses any volatilized lead not recovered in the furnace 30), dust collector section 34 (which traps finely divided lead-contaminated particulates), and a final gas scrubbing section 36. The particulates recovered from the cooler and dust collector sections 32, 34, respectively, are recycled to the inlet of the smelting furnace 30 to recover substantially all lead.

The smelting furnace 30 is fueled primarily by the combustible gas formed by the pyrolysis of the battery casings in the plasma arc furnace 18. However, there may be instances where the thermal capacity of the combustible gas transferred via line 20 is insufficient to fuel the smelting furnace properly. Thus, the smelting furnace is provided according to this invention with a temperature probe 40 which measures the temperature in the furnace's combustion chamber. The temperature signal supplied by the temperature probe is fed to a fuel flow controller 42 which compares the measured temperature against a temperature set-point and issues appropriate output signals to flow control valves 44, 46, associated with combustible gas line 20 and with a natural gas supply line 48, respectively. As a result, when the temperature probe 40 detects inadequate temperature existing within the combustion chamber of the furnace 30 (indicative of inadequate combustion properties and/or inadequate flow of combustible gas introduced via line 20), the fuel flow controller 42 will then increase the flow of natural gas to the furnace 30 from supply line 48 so as to supplement flow of combustible gas in line 20. In such a manner, the furnace 30 is maintained in continuous operation, even though the plasma arc furnace (and its lead-contaminant remediation functions) are conducted in a batch-wise manner.

The combustible gas generated by the process of this invention can be utilized in a variety of ways other than as a portion of the combustible gas supplied to a furnace 30. For example, the combustible gas can be supplied as a fuel to an internal combustion engine and converted thereby directly into electrical energy. (See in this regard, U.S. Pat. No. 5,439,498, the entire content of which is expressly incorporated hereinto by reference.) Alternatively, the combustible gas generated by the process of this invention may be converted into a chemical feed stock in methanol, sulfur extraction, carbon dioxide conversion, and the like.

As noted briefly above, the process in accordance with the present invention necessarily employs a DC plasma arc furnace. DC plasma arc furnaces are, in and of themselves well known as evidenced from U.S. Pat. Nos. 3,940,551 and 3,999,000 (the entire contents of each being expressly incorporated hereinto by reference). A particularly preferred DC plasma arc furnace that may be used in the practice of the present invention is more specifically depicted in accompanying FIG. 2 (see also, U.S. Pat. No. 4,177,061, the entire content of which is expressly incorporated hereinto by reference).

As is seen, the plasma arc furnace 18 includes a sealed refractory shell or crucible 18c, it being understood that the complete shell 18c is not depicted in FIG. 1 for clarity of presentation. A conductive plate 50 with conductive refractories (some of which are identified by reference numeral 50a) is embedded in the bottom of the shell 18c and supports a molten iron heel 52 which establishes a plasma arc zone 54 with the terminal end of the hollow graphite electrode 56. A conductive copper plate 58 supports the refractories 50a. A stationary feed conduit 60 coaxially enters through the roof of the refractory shell 18c and is sealed by means of high temperature split clamp assembly 62. The feed conduit 60 is coaxially, but slidably, coupled to the upper end of the electrode 56 by suitable adaptor/gas seal structures 64 so as to allow the electrode 56 to be reciprocally moveable relative to the feed conduit 60 towards and away from the iron heel 52 (e.g. via driven adjustment arm member 53 as shown in FIG. 1). A rotary valve 66 permits the soil and waste battery casing mixture to be introduced into the interior of the furnace 18 concurrently with the plasma gas. An inert gas port 68 downstream of the valve 66 permits an inert gas (e.g., recycled off-gas, $N_2$, argon or the like) to be introduced into the furnace 18 so as to allow for control over the furnace atmosphere (e.g., so as to create a reducing atmosphere within the furnace 10) thereby reducing final off-gas volume for discharge to atmosphere.

Controlled amounts of an oxidizing gas, such as oxygen, air, or steam, may be introduced into the gas space above the slag 70 within the furnace either through the hollow electrode 56, or through an auxiliary port in the roof of the furnace (not shown). The preferred embodiment utilizes a metered quantity of oxygen for this purpose so as to minimize the volume of off-gas produced at maximum energy content.

The plasma gas which is introduced cocurrently with the soil and battery casing mixture through the hollow electrode 56 may be any inert gas, such as $N_2$, Ar or recycled off-gas for additional re-exposure to the plasma arc.

The plasma arc zone 54 is at a temperature above about 30,000° F. At such an ultrahigh temperature, the slag (or non-volatilized constituents) in the feed mixture) will be maintained at an average temperature at or above about 3,000° F. (typically about 3,200° F.). At such temperatures, a major portion of volatile constituents in the feed mixture will be volatilized. These by-products may then be removed from the furnace through a discharge port 74 located in the upper region of the furnace 18 and recovered as noted previously.

Any non-volatilized material other than metals introduced in the feed stream will partition, or by greater density settle, into theheel or form a slag 70 in an annular zone around the plasma arc zone 54 which circulates in a direction toward the interior of the furnace 18—i.e., toward the plasma arc zone 54 as driven by induction forces emanating from the induction coil 55 and by natural arc stirring. In this regard, the slag 70 forms an annular mass around the ultra high temperature plasma arc generated between the terminal end of the electrode 18a and the heel 52 within the plasma zone 54. Thus, an interior annular portion of the slag 70 near the plasma arc will exhibit a relatively greater temperature than an annular portion of the slag near the furnace walls 18c. This temperature difference will thereby translate into a conductivity difference affecting inductance which causes the annular mass of slag 70 to circulate in either a clockwise or counterclockwise direction (depending upon the direction of electrical current passing through the induction coil 55). At the same time, however, the natural arc pressure within the zone 54 and the temperature difference between the upper and lower surfaces of the mass of slag 70 will cause a general radial circulation towards and away from the plasma zone 54. The combined result of these movements is a natural arc stirring of the slag 70 which causes an annular spiraling circulation.

As noted previously, the molten slag 70 will be at a temperature at or above 3,000° F, typically about 3,200° F. The slag may periodically be withdrawn from the furnace 18 by means of a side tap (not shown) so as to maintain the molten slag 18 in the furnace at acceptable levels. Molten metals in the heel may be withdrawn periodically as required from a bottom tap (not shown). Alternatively, for batch-wise processing, the electrode 54 may be raised upwardly from the iron heel 52 as the slag level increases until such time that the distance between the terminal end of the electrode 54 and the iron heel 52 precludes a plasma arc form being formed therebetween.

It will be observed, therefore, that the terminal end of the plasma torch is positioned below the slag level, but does not contact the slag 70. The plasma torch thus creates a plasma arc zone 54 therearound which maintains the slag 70 at the desired elevated temperature by continual re-exposure of the slag 70 to the ultra high temperature of the plasma arc (i.e., by the annular spiraling effect discussed above) so as to achieve metals separation. Therefore, by controlling the atmosphere within the furnace 18 so as to minimize off-gassing, the process of the present invention is capable of recovering substantial amounts (e.g., greater than about 98%, and typically greater than about 99.95%) of lead which is present in the feed mixture. Such recovered molten lead can then be reused commercially. In this regard, the recovered molten lead, not vaporized, will sink below the slag level due to its greater specific gravity and form a stratified (partitioned) molten layer under the iron heel 52. As such, the furnace 18 may be selectively tapped at the level of the stratified molten lead so as to withdraw it from the furnace shell and form, e.g., lead ingots for further processing.

Thus, according to the present invention, the plasma arc furnace and the controlled atmosphere therein serve to melt or volatilized lead and other materials in the feed mixture (e.g., contaminated soil and battery casings). Volatilized metals are removed from the furnace with furnace off gas solids and can be recovered and recycled into useable products using conventional metallurgical practice. Metals that remain in the furnace are accumulated and periodically tapped for further processing. Trace amounts of metals that are not volatilized or removed form the furnace are chemically or physically bound in the slag from the furnace in a form which exhibits very low leachability when subjected to testing using the U.S. Environmental Protection Agency's toxicity characteristic leaching procedure (TCLP). The slag, composed primarily of silica, is an inert material that can be physically processed into materials used for construction, abrasives, and the like.

As can be appreciated, therefore, the present invention can be employed to treat other hazardous waste materials in addition to the lead-contaminated soil disclosed specifically above. Thus, for example, the present invention can be used to process low level radioactivity-contaminated containers, industrial chemical wastes, heavy metal wastes and the like. Moreover, when contaminated metals are processed, the present invention allows the base metals to be recovered substantially (e.g., greater than about 98%) and segregated into molten strata within the furnace relative to the iron heel. Selective tapping of the furnace will thus enable these separated metals to be recovered and reused. Therefore, the present invention can similarly be used in smelting operations.

A further understanding of this invention will be obtained by reference to the following non-limiting Examples.

EXAMPLES

Example I

Figure 2:
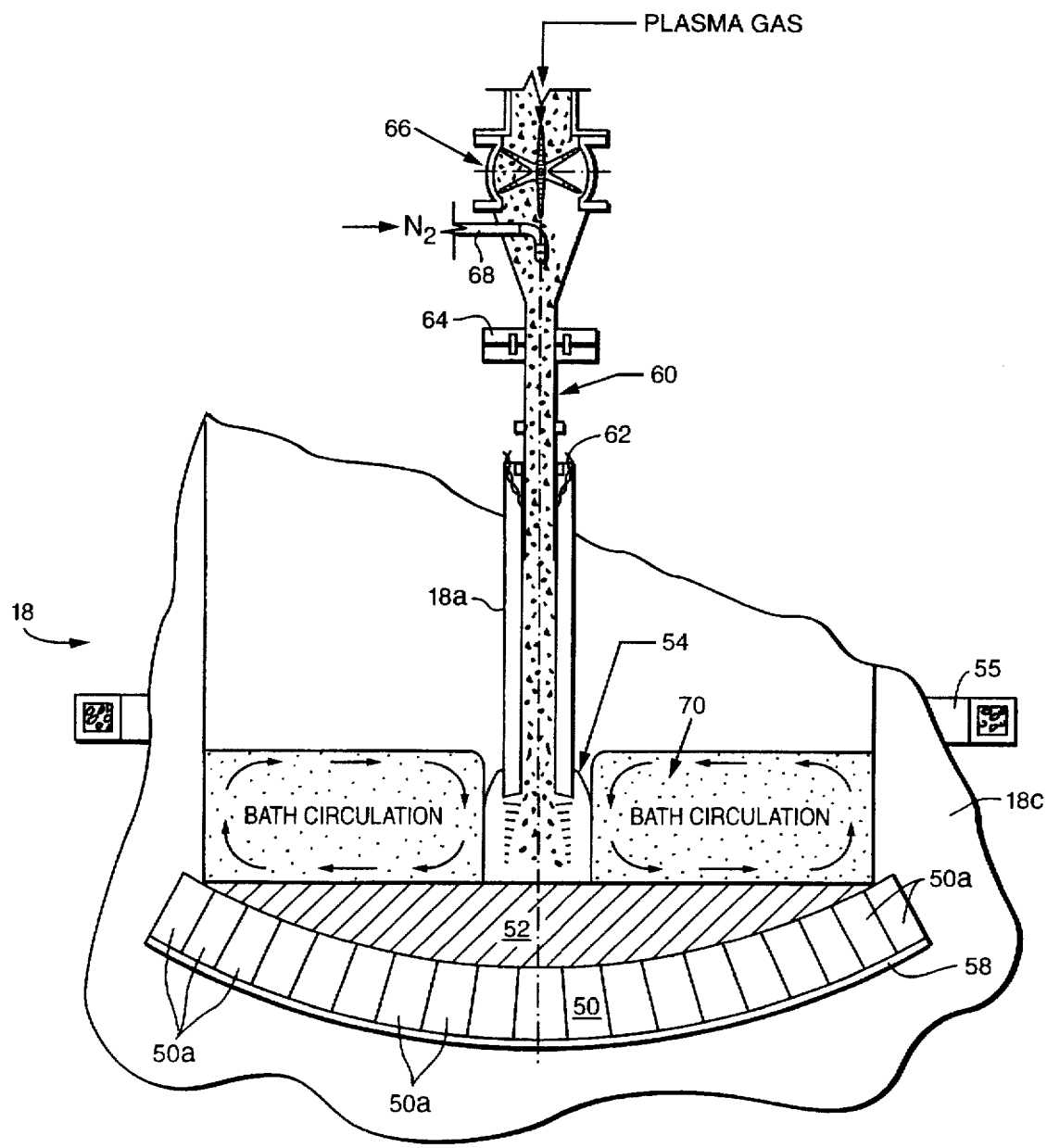

A DC plasma arc furnace as shown in FIG. 2 was employed in several "heats" designated Heat 1-1 through Heat 1-4 using test feed material mixtures. Heats 1-1 and 1-2 were conducted with little or no addition of battery case materials to the furnace. The furnace was operated generally under oxidizing atmospheres. During the final charges of heats 1-3 and 1-4, however, ground battery cases were added. Prior to initiating the feed of materials into the furnace, it was necessary to provide a molten iron heel for conduction purposes. Thus, scrap iron and/or steel was added and was melted during electrical start-up of the furnace. The feed materials and furnace products obtained according to this Example I are shown in Table 1 below.

TABLE 1

|  | Heat Number | | | |
|---|---|---|---|---|
|  | 1-1 | 1-2[1] | 1-3[2] | 1-4[1] |
| Feed Materials (Lbs.): | | | | |
| Shale | 210.0 | 215.9 | 474.7 | 344.0 |
| PbSO$_4$ | 10.0 | 10.6 | 22.4 | 14.7 |
| CaO | 2.0 | 1.2 | 2.6 | 2.0 |
| Casings | — | 0.9 | 2.2 | 6.6 |
| SiO$_2$ Sand | — | — | 13.0 | — |
| Total (Lbs.): | 222.0 | 228.6 | 514.9 | 367.3 |
| Furnace Products (Lbs.): | | | | |
| Slag | 430.0 | 340.0 | 760 | 580.0 |
| Metal | 330.0 | 100.0 | — | <10[3] |
| Pb Content in Slag (mg/kg) | 25.0 | 95.0 | 19.5 | 24.0 |
| Pb Removal From Feed (%) | 99.83 | 99.56 | 99.90 | 99.56 |
| Off gas Analysis: | | | | |
| O$_2$ (vol. %) | 16.1 | 16.3 | — | — |
| CO$_2$ (vol. %) | 4.0 | 4.0 | — | — |
| NO$_x$ (ppm) | 444.7 | 447.4 | — | — |
| CO (ppm) | 279.4 | 274.8 | — | — |
| SO$_2$ (ppm) | 120.3 | 122.2 | — | — |
| TCLP Leachate Analysis: (mg/l) | <0.5 | <0.5 | <0.2 | <0.5 |

Notes:
[1] Feed materials are expressed as the total of two charges during the heat cycle.
[2] Feed materials are expressed as the total of four charges during the heat cycle.
[3] Metal tapped from furnace was iron from start-up molten heel.

Example II

Example I was repeated in order to further investigate lead removal rates and off gas composition according to the process of this invention. A total of eight "Heats" were conducted according to this Example II, the results of which are identified in Table 2 below.

TABLE 2

|  | Heat Number | | | | | | | |
|---|---|---|---|---|---|---|---|---|
|  | 2-1 | 2-2 | 2-3 | 2-4 | 2-5 | 2-6 | 2-7 | 2-8 |
| Feed Materials (Lbs.): | | | | | | | | |
| Shale | 227.6 | 94.9 | 131.2 | 229.0 | 120.8 | 85.3 | 38.8 | 33.8 |
| PbSO$_4$ | 12.6 | 2.4 | 6.8 | 12.2 | 6.4 | 4.8 | 2.3 | 2.2 |
| CaO | 11.4 | 5.1 | 7.5 | 13.5 | 7.2 | 5.3 | 2.6 | 2.4 |
| Casings | 0.9 | 1.6 | 4.5 | 16.3 | 8.6 | | | |
| Total (Lbs.): | 252.5 | 104.0 | 150 | 271.0 | | | | |
| Furnace Products (Lbs.): | | | | | | | | |
| Slag | 270 | 114.6 | — | 543[1] | — | — | — | 388[2] |
| Metal | | 28.0 | — | 43[1] | — | — | — | 40[2] |
| Pb Content in Slag (mg/kg) | 21.0 | 54.0 | — | 33.0[1] | 49.0 | 34.0 | 28.0 | 17.0 |
| Pb Removal From Feed (%) | 99.93 | 99.62 | — | 99.96[1] | — | — | — | 99.98[2] |
| Off gas Analysis: (vol. %) | | | | | | | | |
| O$_2$ | — | — | — | — | 3.86 | — | 4.53 | 2.77 |
| CO$_2$ | — | — | — | — | 8.59 | — | 3.85 | 2.71 |
| CO | — | — | — | — | 12.00 | — | 23.10 | 29.80 |
| H$_2$ | — | — | — | — | 5.24 | — | 7.09 | 12.00 |
| N$_2$ | — | — | — | — | 70.30 | — | 61.40 | 52.60 |

TABLE 2-continued

|  | Heat Number | | | | | | | |
|---|---|---|---|---|---|---|---|---|
|  | 2-1 | 2-2 | 2-3 | 2-4 | 2-5 | 2-6 | 2-7 | 2-8 |
| Methane | — | — | — | — | ND[3] | — | ND[3] | ND[3] |
| non-Methane HC (ppm) | — | — | — | — | 20.00 | — | 4.20 | 2.90 |
| TCLP Leachate Analysis: (mg/l) | <0.5 | <0.5 | — | <0.04[1] | <0.5 | 0.58 | <0.5 | <0.15 |

Notes:
[1]Total Amount for Heats 2-3 and 2-4
[2]Total Amount for Heats 2-5 through 2-8
[3]None Detected As the data above indicate, lead-contaminated soil and battery casings can be pyrolyzed so as to gasify the battery casings and vitrify the soil. As a result, therefore, the gasified battery casings can be employed as a primary combustion gas of a conventional smelting furnace system such that a major proportion of the lead contaminant will be entrained by the gas and hence likewise transferred to the smelting furnace system where it can be recovered by conventional lead control apparatus/techniques. The vitrified slag which results will provide a non-leachable host for any residual lead (or other heavy metals) not gasified and transferred to the smelting furnace system and, as such, is a non-toxic material (according to TCLP tests) which can be commercialized (e.g., as a roadway material or asphalt filler) or simply returned to the landfill.

Thus, while the present invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A process for the treatment of lead-containing hazardous materials comprising forming a plasma arc in a DC plasma arc furnace between a terminal end of a hollow electrode and an electrically conducive heel, and introducing a lead-containing hazardous material into the hollow of the electrode to expose the lead-containing hazardous material to the plasma arc and thereby render the same non-hazardous.

2. A method as in claim 1, which further comprises adding a carbon source to said lead-containing hazardous material.

3. A method as in claim 2, wherein said carbon source is coke breeze or coal.

4. A method as in claim 1, wherein said waste material is lead-contaminated lead-acid battery casings.

5. A method as in claim 1, which includes feeding a flux material together with a mixture of landfill soil and said lead-containing hazardous material into the plasma arc furnace.

6. A method for the remediation of hazardous landfill material including feeding hazardous landfill material cocurrently with a plasma gas through a hollow electrode of a DC plasma arc furnace, creating a plasma zone by forming a plasma arc between the terminal end of the hollow electrode and an electrically conductive heel in the furnace, and allowing the hazardous landfill material to be continually exposed to said plasma torch as part of an annular slag zone surrounding said electrode, whereby the landfill material is rendered non-hazardous.

7. A method as in claim 6, wherein the landfill material is a mixture of waste lead-acid battery casings and soil.

8. A method as in claim 6, which includes feeding a flux material together with the landfill material.

9. A method as in claim 6, wherein the hazardous material includes lead.

* * * * *